US011569764B2

(12) United States Patent
Jaensch et al.

(10) Patent No.: US 11,569,764 B2
(45) Date of Patent: Jan. 31, 2023

(54) CONFIGURATION OF A BATTERY OF A VEHICLE HAVING A PLURALITY OF DRIVE UNITS

(71) Applicant: Dr. Ing. h.c. F. Porsche Aktiengesellschaft, Stuttgart (DE)

(72) Inventors: Malte Jaensch, Bietigheim-Bissingen (DE); Jan Kacetl, Gemmrigheim (DE); Tomas Kacetl, Gemmrigheim (DE); Hermann Helmut Dibos, Remchingen (DE); Eduard Specht, Bruchsal (DE); Christian Korte, Karlsruhe (DE); Stefan Götz, Forstern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/297,998

(22) Filed: Mar. 11, 2019

(65) Prior Publication Data

US 2019/0288617 A1 Sep. 19, 2019

(30) Foreign Application Priority Data

Mar. 19, 2018 (DE) .......................... 102018106307.5

(51) Int. Cl.
*H02P 6/08* (2016.01)
*H02P 29/20* (2016.01)
(Continued)

(52) U.S. Cl.
CPC ............... *H02P 5/74* (2013.01); *H02P 27/14* (2013.01); *B60L 50/60* (2019.02); *B60Y 2200/91* (2013.01); *B60Y 2400/60* (2013.01)

(58) Field of Classification Search
CPC ............... Y02T 10/92; H02P 3/12; H02P 9/14
See application file for complete search history.

(56) References Cited

U.S. PATENT DOCUMENTS 9,899,948 B2 * 2/2018 Butzmann ............... B60L 58/21
2007/0200521 A1 8/2007 Ochiai et al.
(Continued)

FOREIGN PATENT DOCUMENTS

DE 102010052934 A1 5/2012
DE 102011087031 A1 5/2013
(Continued)

OTHER PUBLICATIONS

Japanese Notice of Reasons for Refusal for Japanese Application No. 2019-043528, dated Feb. 12, 2020, 4 pages.
(Continued)

*Primary Examiner* — Muhammad S Islam
*Assistant Examiner* — Charles S Laughlin
(74) *Attorney, Agent, or Firm* — RatnerPrestia

(57) ABSTRACT

A method for configuring a battery for operation of at least two N-phase electric machines, in which a battery includes a plurality of energy modules, and the energy modules each have at least one energy cell and at least two power switches. A respective N-phase electric machine is assigned a respective group of the plurality of energy modules, and the assignment is carried out in accordance with an estimation of a respective energy consumption of the respective N-phase electric machines on the basis of a respective load of the respective N-phase electric machines which load is to be assumed.

16 Claims, 4 Drawing Sheets

(51) Int. Cl.
*H02P 9/04* (2006.01)
*H02P 5/74* (2006.01)
*H02P 27/14* (2006.01)
*B60L 50/60* (2019.01)

(56) References Cited

U.S. PATENT DOCUMENTS

| | | |
|---|---|---|
| 2009/0033254 A1 | 2/2009 | Nagashima et al. |
| 2010/0194318 A1* | 8/2010 | Aso .................. B60L 58/20 |
| | | 307/151 |
| 2013/0293165 A1* | 11/2013 | Feuerstack ............ H02J 7/0025 |
| | | 318/139 |
| 2014/0287278 A1 | 9/2014 | Despesse |
| 2014/0340047 A1 | 11/2014 | Weissenborn et al. |
| 2014/0358350 A1* | 12/2014 | Schmidt ............... B60L 3/0046 |
| | | 429/50 |
| 2015/0056479 A1* | 2/2015 | Poehler ............... H01M 10/052 |
| | | 429/50 |
| 2015/0309547 A1 | 10/2015 | Huang et al. |
| 2016/0241028 A1 | 8/2016 | Long |
| 2017/0054306 A1 | 2/2017 | Vo et al. |
| 2017/0070175 A1* | 3/2017 | Butzmann .............. B60L 58/21 |
| 2017/0207631 A1* | 7/2017 | Helling .................. H02J 3/387 |
| 2017/0279373 A1 | 9/2017 | Götz et al. |
| 2018/0043789 A1 | 2/2018 | Goetz |

FOREIGN PATENT DOCUMENTS

| | | |
|---|---|---|
| DE | 102014110410 A1 | 1/2016 |
| DE | 102016105542 A1 | 9/2017 |
| JP | 2010152547 A | 7/2010 |
| WO | 2011127251 A2 | 10/2011 |
| WO | 2017114802 A1 | 7/2017 |

OTHER PUBLICATIONS

Chinese Office Action for Chinese Application No. 2019102028324, dated Apr. 29, 2022, with translation, 22 pages.

* cited by examiner

CONFIGURATION OF A BATTERY OF A VEHICLE HAVING A PLURALITY OF DRIVE UNITS

CROSS-REFERENCE TO RELATED APPLICATION

This application claims priority to German Patent Application No. DE 10 2018 106 307.5, filed Mar. 19, 2018, which is incorporated by reference herein in its entirety.

FIELD OF THE INVENTION

The present invention relates to a method, to a system and to a multi-level converter system for an electric vehicle having at least two electric motors which are assigned to a respective drive unit, in which modules of a battery are organized with respect to an assumed energy consumption of the respective electric motors.

BACKGROUND OF INVENTION

Modern electrically operated vehicles typically have more than one drive motor. If, for example, in each case, one electric motor is arranged on a front axle and one electric motor is arranged on a rear axle, the respective electric motors have a separate alternating current system. The reason for this are different effects on the front axle and rear axle, for example during cornering or during unstable driving situations, e.g. when drifting or skidding, and, in particular, different actively set torque distributions at the front and at the rear. Furthermore, a strong acceleration brings about shifting of a center of gravity of the motor vehicle in the direction of the rear axle and strong braking brings about shifting in the direction of the front axle, as a result of which a torque which is to be applied or is applied in the respective electric motor is increased, meaning that, with respect to power flows out of an energy storage element, an increased inflow of power into the electric motor of the rear axle and an increased outflow of power to an energy storage element, so-called recuperation, take place. It can therefore be extremely advantageous to set an unequal torque distribution during braking and accelerating. Moreover, the maximum torques (slip torques) on the front axle and the rear axle are different depending on the driving situation, for example during acceleration as opposed to braking, inter glia owing to the mass distribution which is generated by the driving situation.

Electric motor vehicles usually have a single energy storage element in order to supply the respective electric motors of the front axle and rear axle via a respective power inverter. Generally, a three-phase motor is used as electric motor, wherein a power inverter generates three-phase current for the respective three-phase motor from a direct current, which is made available by the energy storage element. Since inflows of power or outflows of power from the respective three-phase motors act on the same energy storage element, a state of charge of the energy storage element is dependent only on a total amount of energy, which is extracted or fed in.

If a respective energy storage element is also present for a respective electric motor of the front axle and rear axle, the respective state of charge is dependent on a load, which occurs at the respective axle. Since, owing to a center of gravity of the vehicle, an acceleration process mainly gives rise to an outflow of power from an energy storage element which is assigned to the electric motor for the rear axle, and a braking process mainly gives rise to an inflow of power into an energy storage element which is assigned to the electric motor for the front axle, a difference between the states of charge of the respective energy storage elements increases as the duration of the journey becomes longer, which requires an energy transmission system between the energy storage elements. Although such systems are known, they can transmit rather less energy.

Document US 2010/0194318 A1 which is incorporated by reference herein, discloses a vehicle which is driven by a plurality of motors and which is provided with a plurality of batteries for supplying the motors. If a fault occurs in one of the batteries, this battery is removed from the supply.

US document US 2007/0200521 A1, which is incorporated by reference herein, relates to a battery-operated vehicle, which is driven by a plurality of motors. A control device monitors the voltage supply to a power inverter.

Document US 2009/0033254 A1, which is incorporated by reference herein, discloses a dual power inverter system, wherein a respective power inverter is allocated to a fuel cell and to a battery. The power inverter system is configured to operate an AC motor.

All these documents describe electric vehicles or hybrid vehicles having a plurality of energy storage elements, if appropriate also, a plurality of motors and the associated control system. However, none of these documents is based on a reconfigurable DC source. DC/DC converters are inevitably used and disadvantageously entail an increase in weight and require space.

SUMMARY OF THE INVENTION

Against this background, described herein is a method that estimates energy consumption of the respective drive motors and makes available an energy supply, which is tailored to the respective energy consumption, without requiring a costly transmission of energy between differently charged energy storage elements. Additionally disclosed is a corresponding system and a multi-level converter system for carrying out such a method.

More particularly, described herein is a method for configuring a battery for operation of at least two N-phase electric machines is proposed in which a battery comprises a plurality of energy modules, and the energy modules each have at least one energy cell and at least two power switches, wherein a respective N-phase electric machine is assigned a group of the plurality of energy modules, and the assignment is carried out in accordance with an estimation of a respective energy consumption of the respective N-phase electric machines on the basis of a respective load of the respective N-phase electric machines which is to be assumed.

It is conceivable to arrange a respective N-phase electric machine on a respective axle in an electric vehicle. Furthermore, it is conceivable to arrange a respective N-phase electric machine on a respective wheel of the electric vehicle. Depending on the course of a journey and driving style, these N-phase electric machines have different energy consumption. The respective estimation of the load of the individual N-phase electric machines can be acquired from test drives or from journeys preceding a new journey. Adaptation of the estimation to a previously known route profile and/or a previously known driving style of an individual driver is conceivable. It is also conceivable for the respective N-phase electric machines to have different power data, for example in order to take into account a standard higher load of the drive on the rear axle. All these circumstances give rise to different discharging of a split battery, wherein generally uniform loading is to be preferred in order to avoid premature failure of part of the battery, which is used to a greater extent. As a result of the inventive execution of the method, a different loading and, under certain circumstances, a need to have to allow for an exchange of energy between the energy modules of individual groups as a result of different states of charge of the energy modules are advantageously reduced. In this context, different states of charge of the energy modules between individual groups, become all the smaller the better the success in estimating the energy consumption.

In one embodiment of the method according to aspects of the invention, the estimation of the respective energy consumption and the assignment of the energy modules is performed in a continued sequence during the operation of the respective N-phase electric machines. Alternatively to this it is conceivable that the estimation of the respective energy consumption is carried out in advance, i.e. before the respective N-phase machines are put into operation, and the assignment of the energy modules is correspondingly also implemented in advance in a selectively fixed fashion. This generally results in a selectively asymmetrical assignment of the energy modules to the respective N-phase electric machines and therefore in an asymmetrical configuration of the inventive system which comprises the energy modules and the N-phase electric machines.

In one embodiment of the method according to aspects of the invention, each phase of a respective N-phase machine of the at least two N-phase electric machines is assigned a respective subgroup of the group, allocated to the respective N-phase machine, of the plurality of energy modules. There are many conceivable ways of connecting the energy modules to one another in order to ensure that the respective phases are supplied with voltage independently of one another. If, for example, a vehicle in question having a three-phase electric motor which drives a front axle, and a further three-phase electric motor which drives a rear axle, according to aspects of the invention the electric motors which are present are therefore assigned two groups, one for each electric motor, and each group is itself divided into three subgroups in accordance with the three phases.

In one embodiment of the method according to aspects of the invention, some of the energy modules are assigned jointly to at least two N-phase electric machines. As a result, a transmission of energy can take place between these at least two N-phase electric machines. The better the success in estimating the respective energy consumption, the fewer energy modules which are connected to one another have to be made available for the purpose of the transmission of energy.

In a further embodiment of the method according to aspects of the invention, a number of the energy modules in the group of the plurality of energy modules which is assigned to the respective N-phase electric machine is dimensioned. In this case, it is preconditioned that each energy module has a terminal voltage of equal magnitude. The respective number of the energy modules of a respective group is advantageously selected in accordance with the expected load of the respective N-phase electric machine. If the respective energy modules, which form a subgroup, are connected in series, a different group terminal voltage value occurs owing to the different number of the energy modules in the respective groups. However, a current strength per subgroup would remain the same in this case.

In a further embodiment of the method according to aspects of the invention, the respective energy modules in the group of the plurality of energy modules which is assigned to the respective N-phase electric machine are dimensioned in respect of a storage capacity. This requires energy modules with different storage capacity to be made available, which can be achieved, for example, by using energy cells with a different storage capacity. It is also conceivable to change the number of energy cells, which are connected in parallel per energy module. In this context, the terminal voltage per energy cell and therefore also the group terminal voltage value remain unchanged. However, an internal resistance of the respective energy module and therefore a current strength, which is made available, are also changed with the storage capacity. If, for example, the storage capacity of the respective energy module is reduced, the internal resistance of the respective energy module which becomes larger reduces the current strength which is applied by the respective energy module.

In yet another embodiment of the method according to aspects of the invention, the respective energy modules in the group of the plurality of energy modules which is assigned to the respective N-phase electric machine are dimensioned in accordance with the expected load in a terminal voltage which is made available by them. In this context, a number of energy cells which are connected in series per energy module is changed. This changes the terminal voltage of the respective energy module and therefore also the group terminal voltage. Current strength which is respectively made available by the subgroups remains the same, since the number of the energy cells which are possibly connected in parallel per energy module remains the same.

In one embodiment of the method according to aspects of the invention, the energy modules are arranged in a star-shaped topology. A star-shaped arrangement of the energy modules advantageously has N phases for each of the at least two N-phase electric machines, wherein a respective phase is composed of the energy modules of a respective subgroup which is allocated to a respective phase of a respective N-phase electric machine. All the phases are combined at b first end to fora a common point, the so-called neutral point, while a respective phase of an N-phase electric machine is formed at its other end. The neutral point which is formed in this way can differ from neutral points of conventional N-phase voltage supplies which are known from the prior art. It is conceivable to connect fixedly to one another a pair of the energy modules which are closest to the neutral point in each phase, in order to permit a transmission of energy of energy modules which are allocated to a first N-phase electric machine to energy modules which are allocated to a second N-phase electric machine.

In one embodiment of the method according to aspects of the invention, a modular multi-level converter, such as has been disclosed, for example, in document DE 10 2010 052 934 A1 (incorporated by reference) is selected as a battery. It is therefore possible to generate an AC current, necessary for operating an N-phase electric machine, directly from the DC current of the energy modules which are combined to form subgroups.

In one embodiment of the method according to aspects of the invention, the estimation the energy consumption of a respective N-phase electric machine is adapted when a different state of charge occurs in the energy modules, and the assignment of the energy modules to a respective N-phase electric machine is reconfigured on the basis of the adapted estimation. When the multi-level converter is used, such a reconfiguration is achieved by a control which is adapted in this respect.

In addition, a system is claimed, which has at least two N-phase electric machines and a plurality of energy modules, wherein one energy module has at least one energy cell and at least two power switches which are connected to the at least one energy cell of the energy module, wherein a respective N-phase electric machine is assigned or is to be assigned a group of the plurality of energy modules, wherein the assignment is based on an estimation of a respective energy consumption of the respective N-phase electric machines on the basis of a respective load of the respective N-phase electric machines which is to be assumed.

The system according to aspects of the invention is configured to implement a method according to aspects of the invention, and/or the method according to aspects of the invention can be carried out using the system according to aspects of the invention.

In one refinement of the system according to aspects of the invention, the system additionally comprises at least one control unit which is equipped with a computer processor and a computer program which runs on the computer processor, which control unit is configured to control a connection of the energy modules in accordance with an estimation of a respective energy consumption of a respective N-phase electric machine.

In a further refinement of the system according to aspects of the invention, the system additionally comprises sensors which are configured to monitor a respective state of charge of the energy cells and to pass on said state of charge to the computer processor for an estimation of the respective energy consumption of a respective N-phase electric machine, wherein the connection of the energy modules can be reconfigured on the basis of the estimation.

Finally, a multi-level converter system is claimed which is equipped with the system according to aspects of the invention and which is configured to execute the method according to aspects of the invention.

BRIEF DESCRIPTION OF THE DRAWING

Further advantages and refinements of the invention can be found in the description and the appended drawing.

It goes without saying that the features which are specified above the features still to be explained below can be used not only in the respectively given combination but also in other combinations or alone without departing from the scope of the present invention.

DETAILED DESCRIPTION OF THE INVENTION

Figure 1:
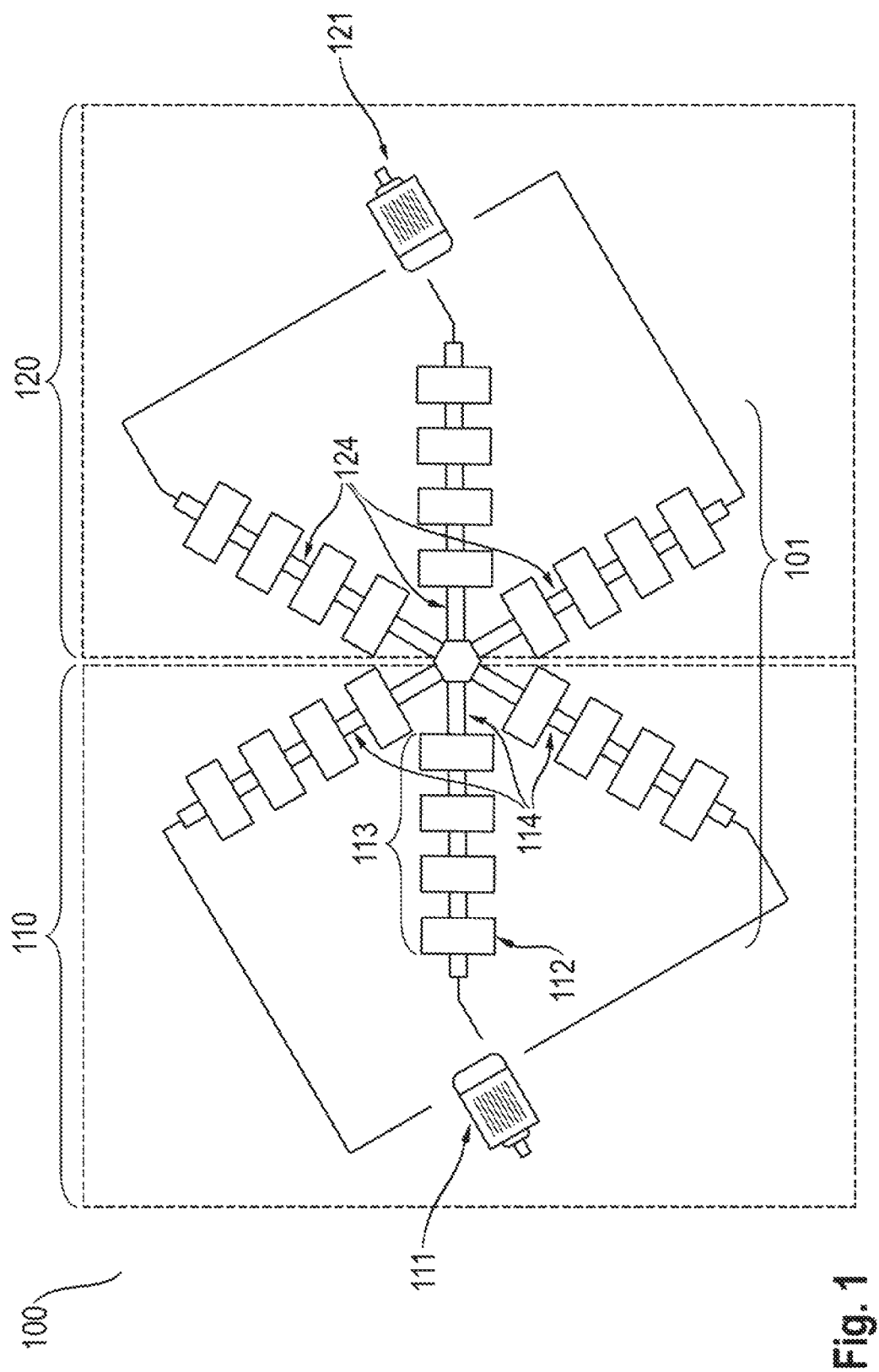
FIG. 1 shows a schematic illustration of two drive systems according to the prior art which are assigned to a respective axle of a motor vehicle.

FIG. 1 shows a schematic illustration 100 according to the prior art of two drive systems 110 and 120 which are assigned to a respective axle of a motor vehicle. A three-phase electric motor 111 and a three-phase electric motor 121 are respectively arranged on a front axle and a rear axle of an electric vehicle. An energy supply of the electric motors 111 and 121 is made available by a multi-level converter system 101 which is embodied in a star shape. The multi-level converter system 101 has a total of six phases 114 and 124, which have two groups of energy modules which are assigned to the respective electric motors 111 and 121. A phase is formed, for example, by a row 113 of energy modules, which has a plurality of identical energy modules such as, for example, energy module 112.

Figure 2:
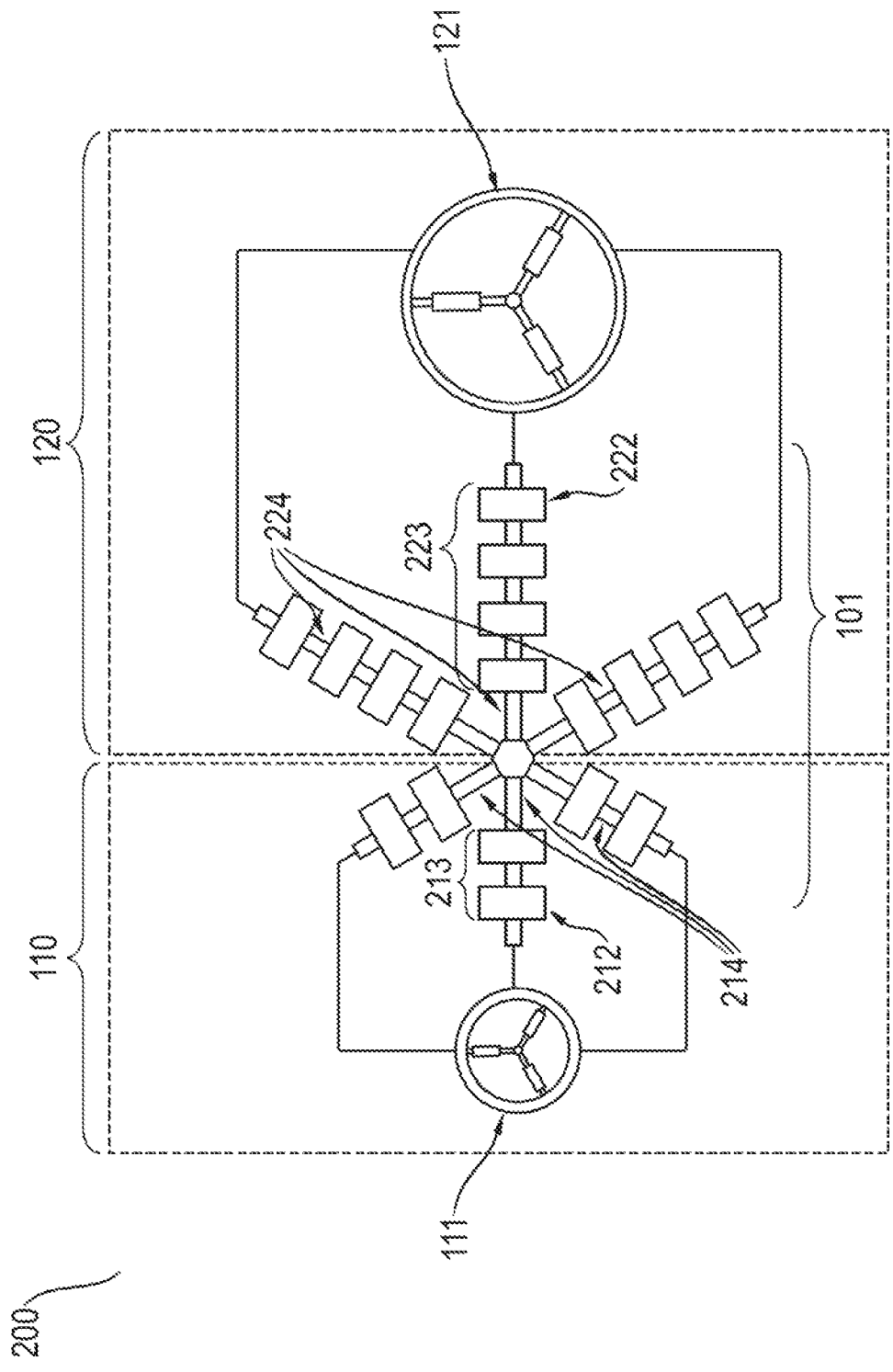
FIG. 2 shows a schematic illustration of an embodiment of the method according to aspects of the invention with a configuration, changed in respect of a number of energy modules, of the drive systems which are assigned to a respective axle of a motor vehicle.

FIG. 2 shows a schematic illustration 200 of an embodiment of the method according to aspects of the invention with a configuration, changed in respect of the number of energy modules, of the drive systems 210 and 220 which are assigned to a respective axle of the motor vehicle. The electric motor 211 which is arranged on a front axle is configured for lower power compared to the electric motor 221 which is arranged on the rear axle. Accordingly, according to aspects of the invention the phases 214 of the multi-level converter 201 are formed with fewer energy modules within the drive system 210 than in comparison the phases 224 within the drive system 220. Therefore, in the drive system 210, a phase is formed, for example, by a row 213 of two identical energy modules, including energy module 212. Accordingly, in the drive system 220 a phase is formed, for example, by a row 223 of four identical energy modules, including energy module 222. Since the respective phases 214 and 224 each have energy modules which are connected in series, a lower group terminal voltage value, and therefore a lower provision of power for the electric motor 211, occurs owing to the lower number of the energy modules in the drive system 210 in comparison with drive system 220.

Figure 3:
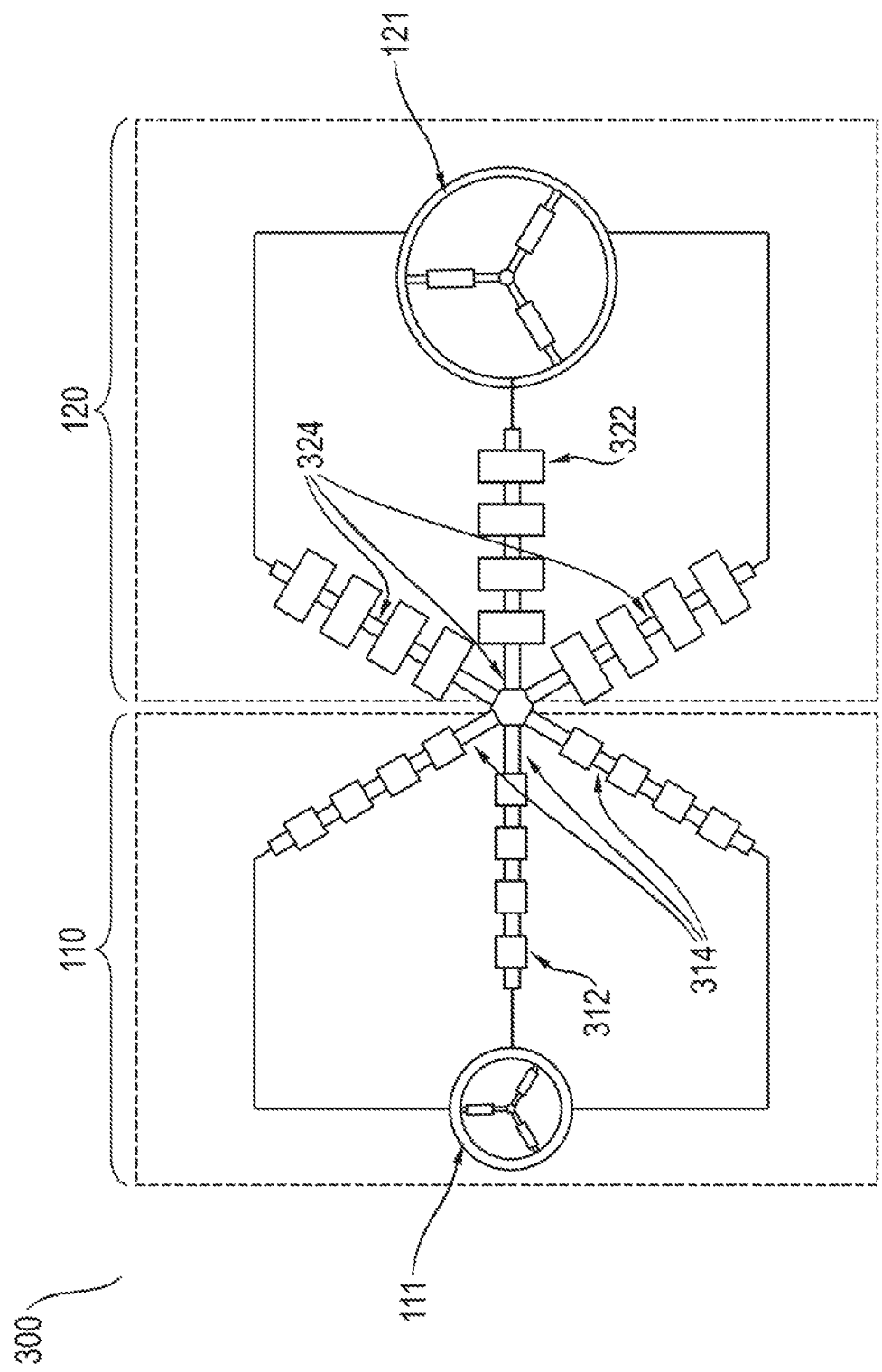
FIG. 3 shows a schematic illustration of an embodiment of the method according to aspects of the invention with a configuration, changed in respect of a number of energy cells per energy module, of the drive systems which are assigned to a respective axle of a motor vehicle.

FIG. 3 shows a schematic illustration 300 of an embodiment of the method according to aspects of the invention with a configuration, changed in respect of a number of energy cells per energy module, of the drive systems 310 and 320 which are assigned to a respective axle of a motor vehicle. The electric motor 311 which is arranged on a front axle, is configured for lower power in comparison with the electric motor 321 which is arranged on the rear axle. Accordingly, according to aspects of the invention the phases 314 of the multi-level converter 301 are formed with a lower number of energy cells per respective energy module within the drive system 310 than in comparison with the phases 324 within the drive system 320. Therefore, an exemplary energy module 312 in the drive system 310 is illustrated as a smaller rectangle than in comparison an energy module 322 in the drive system 320. Since the respective energy cells per energy module are to be connected in series, a lower group terminal voltage value and therefore a lower provision of power for the electric motor 311 occurs owing to the lower number of the energy cells per energy module in the drive system 310 in comparison with drive system 320.

Figure 4:
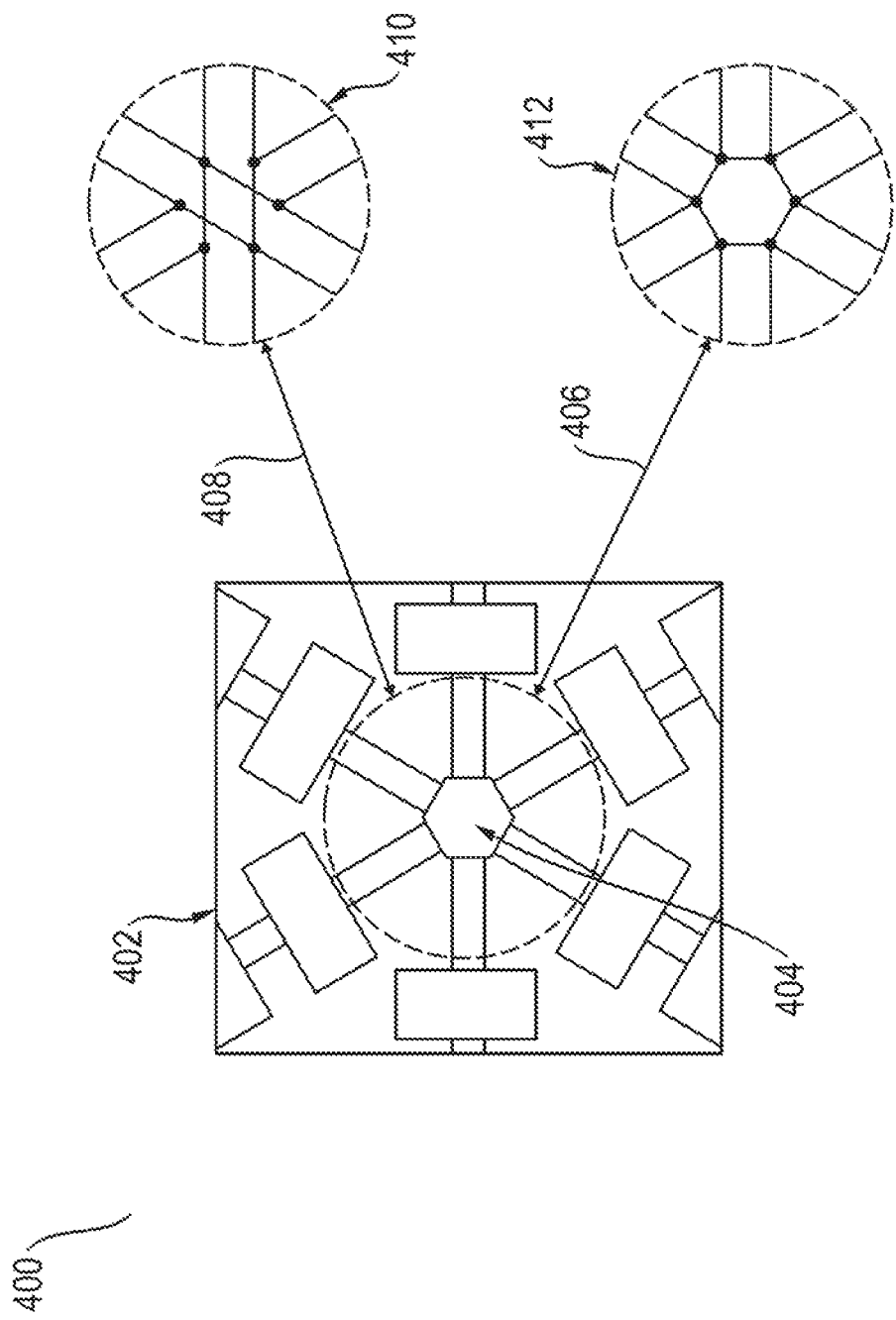
FIG. 4 shows a schematic illustration of two implementations of a star point for drive systems which are obtained by means of an embodiment of the method according to aspects of the invention.

FIG. 4 shows a schematic illustration 400 of two exemplary implementations 410, 412 of a star point 404 for drive systems which are obtained by means of an embodiment of the method according to aspects of the invention. The detail 402 illustrates the region around a star point 404 such as is obtained for example by executing the method according to aspects of the invention in the illustrations 200 and 300. A respective dashed circle surrounds a respective region of the star point 404 which is illustrated in more detail by the detailed connection of the respective implementation 410, 412, shown by double arrows 408 and 406. The implementation 410 constitutes here a connection in which the respective phases of energy modules can exchange energy via the neutral point. A voltage from phase to phase is reduced. Accordingly, the implementation 412 illustrates a single-point connection which does not permit a transmission of energy between the phases. The voltage from phase to phase is retained. It is conceivable that a respective topology of the power switches, taking into account all the energy modules, and a respective arrangement of the energy modules to form phases makes it possible to switch between the respective implementations, here for example 410 and 412, during operation. A suitable design can even increase the voltage from phase to phase here.

What is claimed:

1. A method for configuring a battery for operating at least two N-phase electric machines, in which the battery is a modular multi-level converter comprising a plurality of energy modules each having at least one energy cell and at least two power switches, the method comprising:
    estimating a respective energy consumption of the respective N-phase electric machines on the basis of a respective load of the respective N-phase electric machines which is to be assumed based on data collected during a previous operation of the respective N-phase electric machines;
    assigning a respective N-phase electric machine to a respective group of the plurality of energy modules based upon an estimate from the estimating step such that each phase of each respective N-phase electric machine is assigned a different respective subgroup of the respective group of the plurality of energy modules, with each respective subgroup of all of the respective groups of the plurality of energy modules connected to one another at a common neutral point;
    dimensioning a number of the energy modules in the respective group of the plurality of energy modules assigned to the respective N-phase electric machine; and
    selectively transferring energy between the respective groups of energy modules via the common neutral point using the power switches.

2. The method as claimed in claim 1, in which the estimation of the respective energy consumption and the assignment of the energy modules is performed in a continued sequence during the operation of the respective N-phase electric machines.

3. The method as claimed in claim 1, in which some of the energy modules are assigned jointly to at least two N-phase electric machines.

4. The method as claimed in claim 1, wherein the dimensioning is with respect to a storage capacity of the plurality of energy modules.

5. The method as claimed in claim 1, wherein the dimensioning is with respect to a terminal voltage which is made available by the plurality of energy modules.

6. The method as claimed in claim 1, further comprising arranging the energy modules in a star-shaped topology.

7. A system for configuring a battery for operation of at least two N-phase electric machines, said system comprising:
    at least two N-phase electric machines;
    wherein the battery is a modular multi-level converter comprising a plurality of energy modules, wherein one energy module has at least one energy cell and at least two power switches which are connected to the at least one energy cell of the energy module,
    wherein a respective N-phase electric machine either is assigned or is assignable to a group of the plurality of energy modules,
    wherein the assignment is based on an estimation of a respective energy consumption of the respective N-phase electric machines on the basis of a respective load of the respective N-phase electric machines which is to be assumed based on data collected during a previous operation of the respective N-phase electric machines,
    wherein the assignment is made such that each phase of each respective N-phase electric machine is assigned a different respective subgroup of the respective group of the plurality of energy modules, with each respective subgroup of all of the respective groups of the plurality of energy modules connected to one another at a common neutral point, wherein energy is selectively transferred between the respective groups of energy modules via the common neutral point using the power switches, and
    wherein a number of the energy modules in the respective group of the plurality of energy modules assigned to the respective N-phase electric machine is dimensioned.

8. The system as claimed in claim 7, further comprising at least one control unit which is equipped with a computer processor and a computer program which runs on the computer processor, the control unit being configured to control a connection of the energy modules in accordance with the estimation of the respective energy consumption of a respective N-phase electric machine.

9. The method as claimed in claim 1, wherein the battery consists of two groups of the plurality of energy modules, and each of the two groups of the plurality of groups consists of three of the respective subgroups, such that exactly six of the respective subgroups are connected to one another at the common neutral point.

10. The method as claimed in claim 1, further comprising switching, during operation of the respective N-phase electric machines, between a connection in which respective phases of the plurality of energy modules exchange energy via the common neutral point, and a connection which does not permit the exchange of energy between the respective phases of the plurality of energy modules via the common neutral point.

11. The system as claimed in claim 8, the control unit being configured to control a connection of the energy modules in accordance with the estimation of the respective energy consumption of a respective N-phase electric machine during the operation of the respective N-phase machines.

12. A multi-level converter system comprising the system as claimed in claim 11.

13. The method as claimed in claim 1, in which the estimation of the energy consumption of the respective N-phase electric machine is adapted when a different state of charge occurs in the energy modules, and the assignment of the energy modules to the respective N-phase electric machine is reconfigured on the basis of the adapted estimation.

14. The system as claimed in claim 8, further comprising sensors configured to monitor a respective state of charge of the energy cells and to pass on said state of charge to the computer processor for an estimation of the respective energy consumption of a respective N-phase electric machine, wherein the connection of the energy modules can be reconfigured on the basis of the estimation.

15. A method for configuring a battery for operating at least two N-phase electric machines, in which the battery is a modular multi-level converter comprising a plurality of energy modules each having at least one energy cell and at least two power switches, the method comprising:
- estimating a respective energy consumption of the respective N-phase electric machines on the basis of a respective load of the respective N-phase electric machines which is to be assumed;
- assigning a respective N-phase electric machine to a respective group of the plurality of energy modules based on an estimate from the estimating step;
- dimensioning a number of the energy modules in the respective group of the plurality of energy modules assigned to the respective N-phase electric machine with respect to a terminal voltage which is made available by the plurality of energy modules; and
- selectively transferring energy between the respective groups of energy modules via a common neutral point, which interconnects the respective groups of energy modules, using the power switches.

16. The method as claimed in claim 1, in which one of the respective groups of the plurality of energy modules is assigned to one of the two N-phase electric machines for powering a front axle of a vehicle, and another one of the respective groups of the plurality of energy modules is assigned to the other of the two N-phase electric machines for powering a rear axle of the vehicle.

* * * * *